United States Patent
Lambert et al.

(10) Patent No.: US 8,398,283 B2
(45) Date of Patent: Mar. 19, 2013

(54) AUTOMOTIVE SIGNAL LIGHT EMPLOYING MULTI-FOCAL LENGTH LIGHT PIPES

(75) Inventors: Chad D. Lambert, Belleville (CA); James R. McFadden, Oxford, MI (US)

(73) Assignee: Magna International, Inc., Auroa (CA)

( * ) Notice: Subject to any disclaimer, the term of this patent is extended or adjusted under 35 U.S.C. 154(b) by 513 days.

(21) Appl. No.: 12/690,441

(22) Filed: Jan. 20, 2010

(65) Prior Publication Data
US 2010/0195342 A1 Aug. 5, 2010

Related U.S. Application Data

(60) Provisional application No. 61/205,558, filed on Jan. 21, 2009.

(51) Int. Cl.
*F21S 8/10* (2006.01)
(52) U.S. Cl. ......... 362/511; 362/555; 362/507; 362/538
(58) Field of Classification Search ................. 362/511, 362/551, 555, 582, 507, 541, 545, 547, 538
See application file for complete search history.

(56) References Cited

U.S. PATENT DOCUMENTS

| | | | | |
|---|---|---|---|---|
| 7,300,191 B2 * | 11/2007 | Oshio et al. | .................... | 362/545 |
| 7,452,114 B2 * | 11/2008 | Gasquet | ......................... | 362/511 |
| 7,748,874 B2 * | 7/2010 | Cho | ............................... | 362/340 |
| 7,922,369 B2 * | 4/2011 | Condon et al. | ............ | 362/311.01 |

* cited by examiner

*Primary Examiner* — Sharon Payne
(74) *Attorney, Agent, or Firm* — Dickinson Wright

(57) ABSTRACT

An automotive signal light is taught which employs multi-focal length light pipes to collect, collimate and direct, as needed, light emitted from one or more semiconductor light sources. Each multi-focal length light pipe includes at least one light transmission structure, each of which has a light receiving port to receive light emitted from a semiconductor light source spaced from the light receiving port by an air gap. The light transmission structure includes at least two superimposed parabolic reflecting surfaces, each having a common focal point at the light receiving port but having different focal lengths, and the superimposed parabolic reflectors operate to receive, collimate, spread and transmit the light from the semiconductor light source to a light emitting surface of the light pipe which is located adjacent to a lens of the signal light. The aesthetic arrangement of the light pipes is not particularly limited and a wide range of signal light functionalities can be provided.

26 Claims, 5 Drawing Sheets

US 8,398,283 B2

AUTOMOTIVE SIGNAL LIGHT EMPLOYING MULTI-FOCAL LENGTH LIGHT PIPES

CROSS-REFERENCE TO RELATED APPLICATIONS

This application claims the benefit of U.S. Provisional Application No. 61/205,558, filed Jan. 21, 2009. The disclosure of the application is incorporated herein by reference.

FIELD OF THE INVENTION

The present invention relates to an automotive signal light which employs semiconductor light sources. More specifically, the present invention relates to an automotive signal light which employs semiconductor light sources and at least one multi-focal length light pipe to produce a desired output light pattern.

BACKGROUND OF THE INVENTION

It is known to employ semiconductor light sources, in particular light emitting diodes (LEDs), in automotive signal lights. For example, tail lights on some vehicles include an array of red light-emitting and/or amber light-emitting LEDs which are positioned between a reflector and a lens to provide the desired signal patterns. It is also known to have signal lamps wherein one or more LEDs are arranged in a direct view wherein the output of the LED passes directly through the lens of the signal light.

While known signal lights employing LEDs provide advantages over signal lights employing incandescent bulbs, they still suffer from some problems. For example, available LEDs emit limited amounts of light relative to incandescent lamps. Due to these lower emitted levels of light and/or the inefficiency of a conventional reflector and lens in transmitting the light produced by the LEDs, a large number of LEDs must often be employed to produce sufficient signal lighting to meet regulatory requirements. Further, this large number of LEDs must be appropriately spaced about the signal light to provide the lighted surface area required to meet regulatory requirements and thus the aesthetic design of such signal lights is limited.

As will be apparent, next to regulatory and safety concerns, aesthetic design can be one of the most significant considerations for the designer of a vehicle and, to date, the range of aesthetic design available for signal lamps using semiconductor light sources has been limited.

SUMMARY OF THE INVENTION

It is an object of the present invention to provide a novel signal light utilizing semiconductor light sources with at least one multi-focal length light pipe to obviate or mitigate at least one disadvantage of the prior art.

According to a first aspect of the present invention, there is provided an automotive signal light comprising: a substantially weather proof volume defined by at least a housing and a lens; at least one semiconductor light source and heat sink assembly located within the volume; and at least one multi-focal length light pipe located within the volume having at least one light transmission structure with a light receiving port positioned adjacent a respective semiconductor light source to receive light emitted by said one semiconductor light source, the light transmission structure including at least two superimposed parabolic reflecting structures each having a common focal point at the light receiving port and each having a focal length differing from the focal length of the other such that the light transmitting structure receives, collimates, directs and spreads and transmits the light received at the light receiving port to a light emitting surface of the light pipe adjacent the lens to from a desired output light pattern.

The present invention provides an automotive signal light which employs at least one multi-focal length light pipe to collect, collimate and direct, as needed, light emitted from one or more semiconductor light sources. The light emitted from the semiconductor light sources is collimated, focused and spread by the multi-focal length light pipe to obtain a desired output light pattern while allowing for a wide range of aesthetic designs and a wide range of signal light functionalities which can be provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
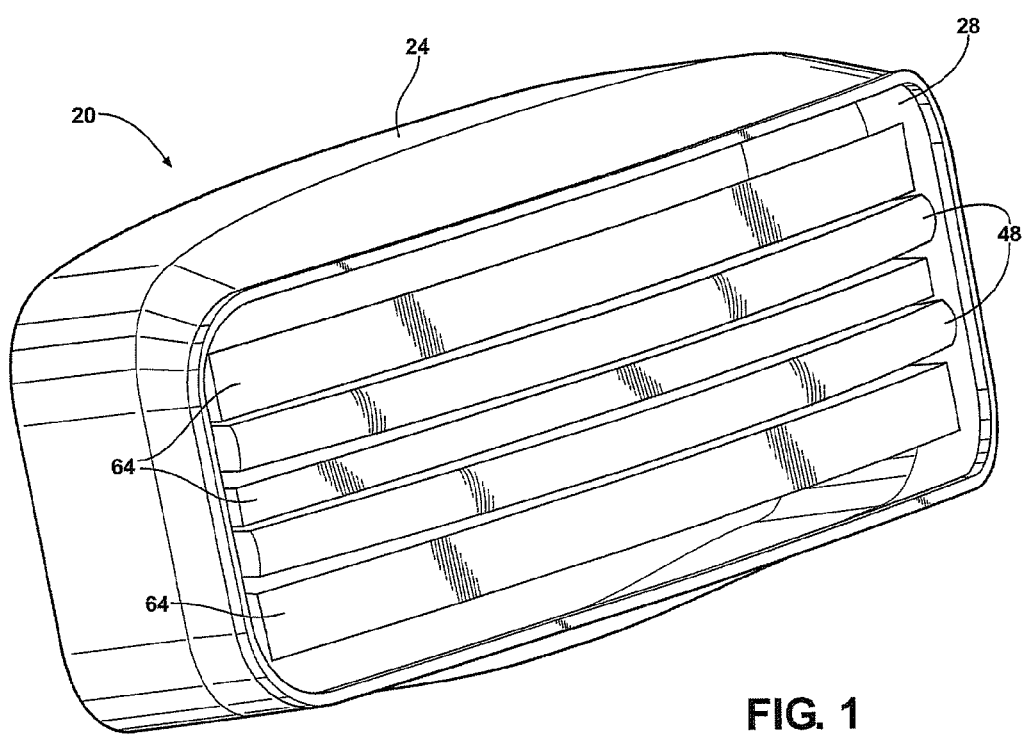
FIG. 1 is a FIG. 1 shows a perspective view of the front of an automotive signal light in accordance with the present invention.
Figure 2:
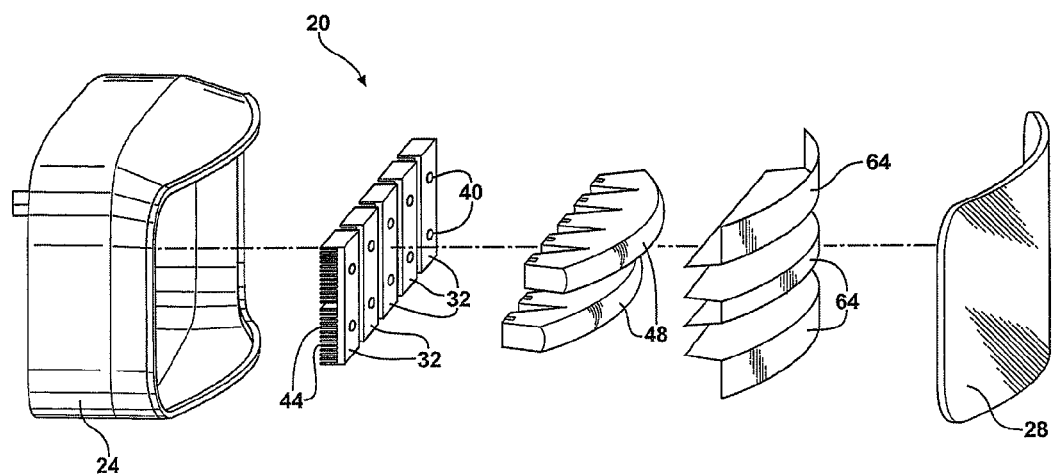
FIG. 2 shows a perspective exploded view of the signal light of FIG. 1.
Figure 3:
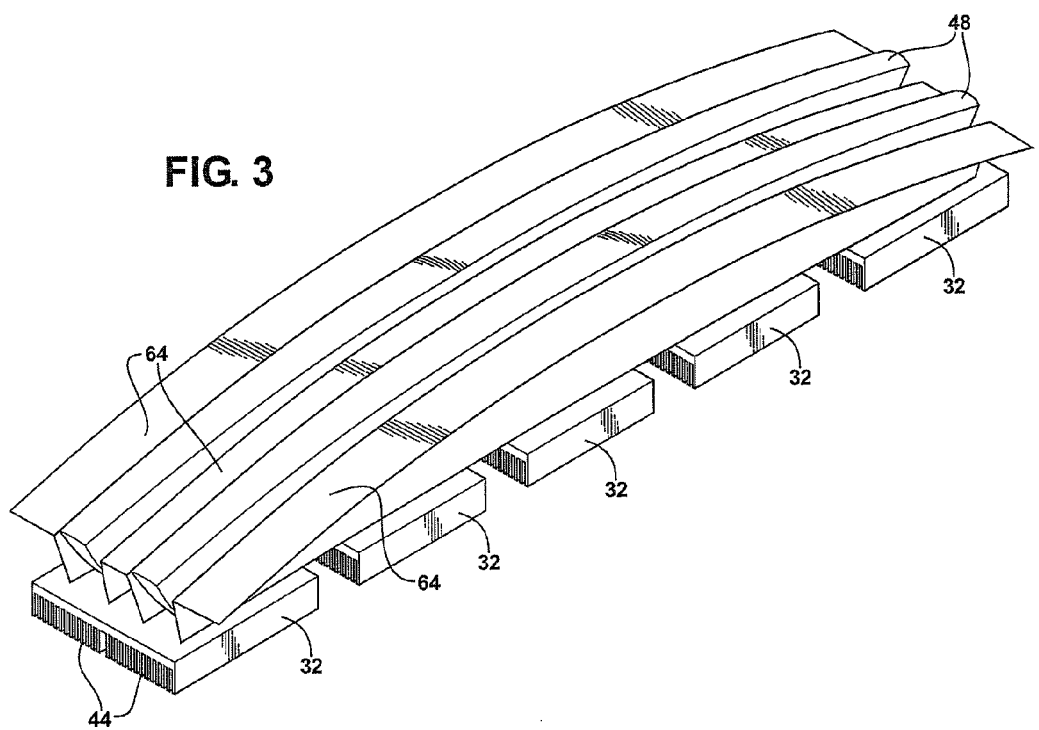
FIG. 3 shows a perspective view of the lighting components of the signal light of FIG. 1.

An automotive signal light in accordance with the present invention is indicated generally at 20 in the accompanying Figures. As best seen in FIGS. 1 and 2, signal light 20 comprises a housing 24, which fabricated from any appropriate material such as PVC, polycarbonate, etc. and a transparent lens 28, which in the illustrated embodiment is clear. As will be apparent to those of skill in the art, lens 28 is fabricated from any suitable transparent material, such as polycarbonate, and tinted one or more colors or clear.

Housing 24 includes an integral back panel, or the portion of the vehicle to which signal light 20 is mounted forms a back panel, such that the interior volume of signal lamp 20 receives the lighting components (described below) in a substantially weather proof manner.

Signal light 20 further comprises at least one light source assembly 32 comprising a heat sink and at least one semiconductor light source 40. Each semiconductor light source 40 is mounted to the heat sink such that waste heat produced by the operation of the semiconductor light sources 40 is transferred to the heat sink, which in turn radiates that waste heat to the surrounding atmosphere via a set of fins 44 (best seen in FIG. 4A). Preferably, to enhance the transfer of heat from the heat sinks to the surrounding atmosphere, fins 44 of each heat sink extend through the back panel outside of the enclosed volume of signal light 20.

In the present embodiment, semiconductor light sources 40 are surface mounted, domed light emitting diodes (LEDs), such as (for example) the Luxeon Rebel™ surface mounted LEDs sold by Philips Lumileds Lighting Company, 370 West Trimble Road, San Jose, Calif.

As discussed below, depending upon the color of the light required to be output by signal light 20, semiconductor light sources 40 selected to produce light of a corresponding color, such as red, amber or white. Each semiconductor light source 40 is mounted to an electrical circuit board 46 (best seen in FIGS. 5B and 5C) and connected thereby to an appropriate electrical power supply (not shown) as will be apparent to those of skill in the art.

Signal light 20 further comprises at least one multi-focal length light pipe 48, each of which receives light emitted by at least one semiconductor light source 40. In the illustrated embodiment, each light pipe 48 receives the light emitted by five semiconductor light sources 40. However, the present invention is not limited to light pipes 48 receiving light from five semiconductor light sources 40 and light pipes 48 can receive light emitted from one or more semiconductor light sources 40 depending upon the size of light pipe 48 and the amount of light required to be emitted from light pipe 48, as will be apparent to those of skill in the art.

Figure 4A:
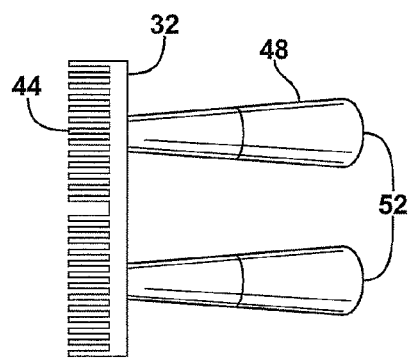
FIG. 4A shows an end view of a pair of multi-focal length light pipes and a light source and heat sink assembly for the signal light of FIG. 1.
Figure 4B:
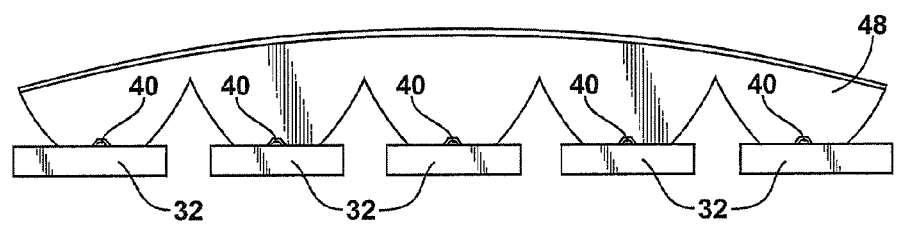
FIG. 4B shows a side view of a multi-focal length light pipe and light source and heat sink assemblies for the signal light of FIG. 1.
Figure 5A:
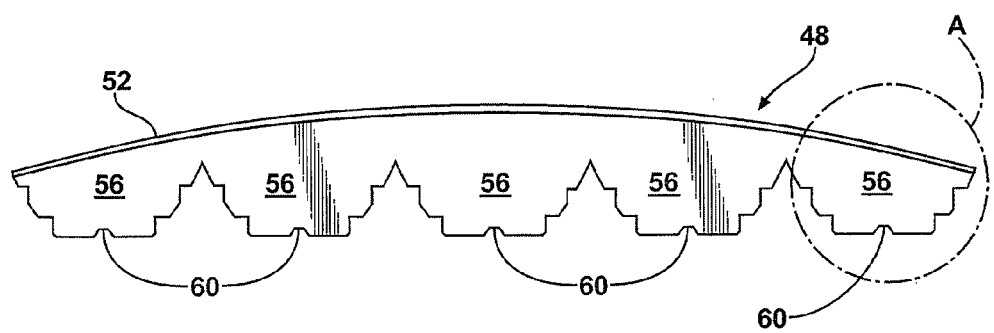
FIG. 5A shows a side view of a multi-focal length light pipe for the signal light of FIG. 1.
Figure 5B:
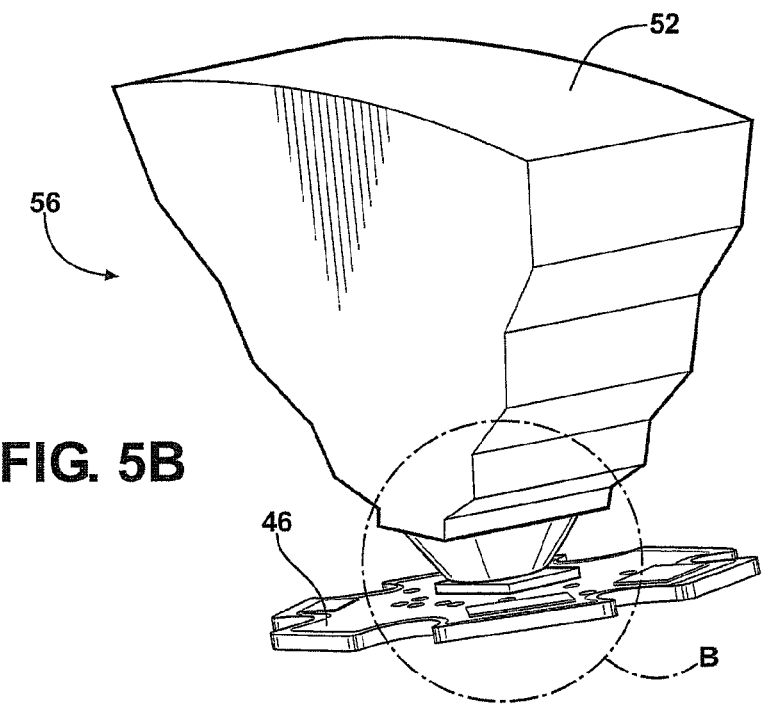
FIG. 5B shows a more detailed cut away perspective view of the portion of the multi-focal length light pipe identified in circle A of FIG. 5B.
Figure 5C:
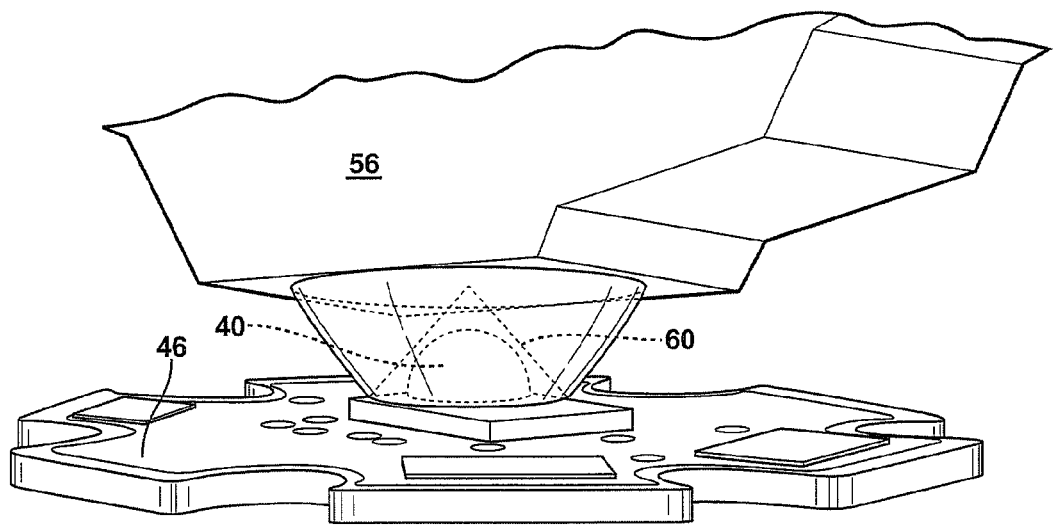
FIG. 5C shows a more detailed cut away perspective view of the portion of the multi-focal length light pipe identified in circle B of FIG. 5B.

Multi-focal length light pipe 48 is shown in more detail in FIGS. 4A and 4B, and in FIGS. 5A, 5B and 5C. As shown, light pipe 48 includes an emitter surface 52 and at least one (and in the illustrated embodiment, five) light transmission structure 56. The number of light transmission structures 56 required on a light pipe 48 depends on the output levels of light emitted by semiconductor light sources 40 and the desired level of light output from light emitting surface 52, and corresponds to the number of light sources 40 used to illuminate the light pipe 48. Semiconductor light sources 40 with higher levels of emitted light can reduce the number of light transmission structures 56 which would other wise be required.

Light pipe 48 is preferably fabricated from an optically clear material, such as acrylic, to ensure that a substantial percentage of the light entering structures 56 is transmitted through transmission structures 56 and out of light emitting surface 52 with minimal transmission losses.

To ensure that a substantial portion of the light emitted by semiconductor light sources 40 is usefully received within structures 56, each structure 56 includes a light receiving port 60 which is generally conic in shape and which surrounds and encompasses the light emitting surface of light source 40. A small air gap (on the order of one millimeter or less) is also provided between light receiving port 60 and the light emitting surface of semiconductor light source 40, as best seen in FIG. 5C.

Light received from light source 40 at input port 60 is transferred from input port 60 through structure 56 to emitter surface 52 by total internal reflection through structure 56. Each structure 56 is designed with at least two parabolic reflector shapes, superimposed upon one another, with each parabolic reflector shape having its focal point at input port 60 but having a different focal length, such that light received at input port 60 is collimated, focused and spread to create the desired output light pattern at light emitter surface 52.

To reduce the amount of material required to form structures 56, material which is otherwise unnecessary, due to the superimposition of the parabolic shapes, can be omitted from structures 56 in a manner similar to that employed with Fresnel lens, etc. In such a case, structures 56 have a "scalloped" shape, as shown in FIGS. 5A, 5B and 5C. While it is presently preferred to omit such unnecessary material when fabricating light pipes 48, the present invention is not so limited and structures 56 can be fabricated with unnecessary material in place, as shown in FIGS. 2 and 4B.

In the illustrated configuration, the light from each structure 56 is focused and shaped within structures 56 such that a generally elongated overall light pattern is formed at emitter surface 52, with the emitted light primarily directed parallel to the elongate axis of multi-focal length light pipe 48. Depending upon the design of the superimposed parabolic reflector shapes in structures 56, other patterns of output light can be created, as will be apparent to those of skill in the art.

The shape of multi-focal length light pipe 48 is not particularly limited and, while in illustrated embodiment light pipe 48 is shown as having light transmission structures 56 arranged in a substantially straight line and light emitting surface 52 being gently curved, the present invention is not so limited and curved configurations of light transmission structures 56 and/or different shapes for light emitting surface 52 can be employed as may be desired for aesthetic or other design purposes.

Further, while in the illustrated embodiment two multi-focal length light pipes 48 are employed, the present invention is not so limited and additional multi-focal length light pipes 48 can be included if desired and the multi-focal length light pipes 48 need not all be the same size or shape. Further still, while in the present embodiment multi-focal length light pipes 48 are shown as being arranged horizontally across signal light 20, the present invention is not so limited and vertical, diagonal or other arrangements of multi-focal length light pipes 48 can be employed as desired.

For aesthetic purposes one or more bezels 64 can be provided about multi-focal length light pipes 48 to complete the design of signal light 20.

As will be apparent to those of skill in the art, signal light 20 can be configured to provide a variety of signal light functions, as desired. For example, if signal light 20 is intended to server as a tail light of an automobile, it can provide running light functionality by illuminating the semiconductor light sources 40 emitting light for one of multi-focal length light pipes 48 at reduced brightness levels and can provide brake light functionality by selectively illuminating those same semiconductor light sources 40 at full brightness when braking.

Similarly, turn signal functionality can be by provided by alternately illuminating and extinguishing the semiconductor light sources 40 emitting light for the other multi-input light pipe 48. As will be apparent to those of skill in the art, a wide variety of other signal light functionalities can be similarly provided. For example, signal light 20 can have a third multi-focal length light pipe (not shown) included within housing 24 which is illuminated by white LEDs to provide a back up light, or license plate illumination, function.

As will now be apparent to those of skill in the art, the present invention teaches an automotive signal light 20 which employs at least one multi-focal length light pipe 48 to collect, collimate, spread and direct, as needed, light emitted from semiconductor light sources. Each multi-focal length light pipe 48 includes at least one light transmission structure, each of which has a light receiving port 60 to receive light emitted from a semiconductor light source 40 spaced from the light receiving port 60 by an air gap. The received light is collimated, spread and transmitted to a light emitting surface 52 which is located adjacent to a lens 28 of the signal light 20. The aesthetic arrangement of the light pipes 48 is not particularly limited and a wide range of signal light functionalities can be provided.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An automotive signal light, comprising:
    a housing;
    a transparent lens connected to said housing;
    at least one light source assembly mounted within said housing;
    two or more multi-focal length light pipes disposed within said housing in proximity to said at least one light source assembly;
    at least one light transmission structure formed as part of each said two or more multi-focal length light pipes such that light produced by said at least one light source assembly transfers through each said at least one light transmission structure of said two or more multi-focal length light pipes to produce a desired beam pattern;
    a light receiving port of said at least one light transmission structure, wherein said light receiving port is substantially conical in shape such that said at least one light receiving port substantially surrounds said at least one light source assembly, and
    two superimposed parabolic reflecting surfaces of each said at least one light transmission structure, wherein said two superimposed parabolic reflecting surfaces have a common focal point at the light receiving port and one of said two superimposed parabolic reflecting surfaces has a different focal length than a second one of said two superimposed parabolic reflecting surfaces such that light is collimated, focused and spread to create a desired beam pattern.

2. The automotive signal light of claim 1, said at least one light source assembly further comprising a plurality of semiconductor light sources.

3. The automotive signal light of claim 2, each of said plurality of semiconductor light sources further comprising a light emitting diode (LED).

4. The automotive signal light of claim 1, wherein said at least one light transmission structure is scalloped in shape.

5. The automotive signal light of claim 1, said housing further comprising a back panel.

6. The automotive signal light of claim 5, further comprising:
    a heat sink which transfers heat away from said at least one light source assembly; and
    a plurality of fins formed as part of said heat sink, said plurality of fins extend through said back panel of said housing for releasing heat from said heat sink.

7. The automotive signal light of claim 5, wherein said back panel is an integral back panel formed as part of said housing.

8. The automotive signal light of claim 5, wherein said back panel is formed by a portion of said vehicle to which said signal light is mounted.

9. The automotive signal light of claim 1, wherein said at least one light transmission structure directs light through said multi-focal length light pipe through total internal reflection.

10. The automotive signal light of claim 1, wherein said housing is made from one selected from the group consisting of polyvinyl chloride (PVC), polycarbonate, and combinations thereof.

11. The automotive signal light of claim 1, wherein said multi-focal length light pipe is made of a clear, acrylic material.

12. The automotive signal light of claim 1, further comprising:
    an emitter surface formed as part of said multi-focal length light pipes; and
    said multi-focal length light pipes include an elongate axis, wherein light emitting from said emitter surface is primarily directed parallel to said elongate axis.

13. The automotive signal light of claim 1, wherein a first focal length of said two or more multi-focal length light pipes provide running light functionality, a second focal length of said two or more multi-focal length light pipes provide brake light functionality, and a third focal length of said two or more multi-focal length light pipes provide back-up light functionality.

14. An automotive signal light, comprising:
    a housing;
    a transparent lens connected to said housing;
    a plurality of semiconductor light source assemblies mounted within said housing;
    two or more multi-focal length light pipes disposed within said housing;
    a plurality of light transmission structures formed as part of said two or more multi-focal length light pipes, each of said plurality of light transmission structures having one focal length, and each of said plurality of light transmission structures receives light from one of said plurality of semiconductor light source assemblies;
    a light receiving port on each of said plurality of light transmission structures, wherein each said light receiving port is substantially conical in shape such that each said at least one light receiving port substantially surrounds a select one of said plurarlity of light source assemblies;
    an emitter surface formed as part of said two or more multi-focal length light pipes such that light is received by said plurality of light transmission structures and is directed out of said emitter surface, and each of said plurality of light transmission structures produces a desired beam pattern; and
    two superimposed parabolic reflecting surfaces of each said plurality of transmission structures, wherein said two superimposed parabolic reflecting surfaces have a common focal point at the light receiving port and one of said two superimposed parabolic reflecting surfaces has a different focal length than a second one of said two superimposed parabolic reflecting surfaces such that light is collimated, focused and spread to create a desired beam pattern.

15. The automotive signal light of claim 14, further comprising:
    a heat sink which removes heat from said plurality of light source assemblies; and a plurality of fins formed as part of said heat sink, said plurality of fins extending out of said housing for releasing heat from said heat sink.

16. The automotive signal light of claim 15, said housing further comprising an integral back panel, wherein said plurality of fins formed as part of said heat sink extend out of said back panel.

17. The automotive signal light of claim 15, said housing further comprising a back panel formed by a portion of said vehicle to which said signal light is mounted, wherein said plurality of fins formed as part of said heat sink extend out of said back panel.

18. The automotive signal light of claim 14, wherein each of said plurality of light transmission structures directs light through said two or more multi-focal length light pipes through total internal reflection.

19. The automotive signal light of claim 14, wherein said housing is made from one selected from the group consisting of polyvinyl chloride (PVC), polycarbonate, and combinations thereof.

20. The automotive signal light of claim 14, wherein said two or more multi-focal length light pipes are made of a clear, acrylic material.

21. The automotive signal light of claim 14, said two ore more multi-focal length light pipes further comprise an elongate axis, wherein light emitting from said emitter surface is primarily directed parallel to said elongate axis.

22. The automotive signal light of claim 14, wherein a first focal length of said two or more multi-focal length light pipes provide running light functionality, a second focal length of said two or more multi-focal length light pipes provide brake light functionality, and a third focal length of said two or more multi-focal length light pipes provide back-up light functionality.

23. The automotive signal light of claim 14, wherein said plurality of light transmission structures is scalloped in shape.

24. The automotive signal light of claim 14, wherein each of said plurality of semi-conductor light source assemblies is a light emitting diode (LED).

25. An automotive signal light comprising:
a substantially weather proof volume defined by at least a housing and a lens;
two or more semiconductor light sources including a heat sink assembly located within the volume; and
two or more multi-focal length light pipes located within the volume and each of said two or more multi-focal length light pipes having at least one light transmission structure with a light receiving port positioned adjacent a respective one of said two or more semiconductor light sources to receive light emitted by said one of said two or more semiconductor light sources, wherein said light receiving port is conical in shape and surrounds one of said two or more light sources, the at least one light transmission structure including at least two superimposed parabolic reflecting structures each having a common focal point at the light receiving port and each having a focal length differing from the focal length of the other such that the light transmitting structure receives, collimates, directs and spreads and transmits the light received at the light receiving port to a light emitting surface of the light pipe adjacent the lens to from a desired output light pattern for a signal light.

26. An automotive signal light in accordance with claim 25, wherein each multi-focal length light pipe provides a different signal function.

* * * * *